V. P. McVOY.
HOSE COUPLING.
APPLICATION FILED FEB. 6, 1909.

939,437.

Patented Nov. 9, 1909.
2 SHEETS—SHEET 1.

Witnesses
M. A. Bond.

Inventor
Vincent P. McVoy.
E. H. Bond
Attorney

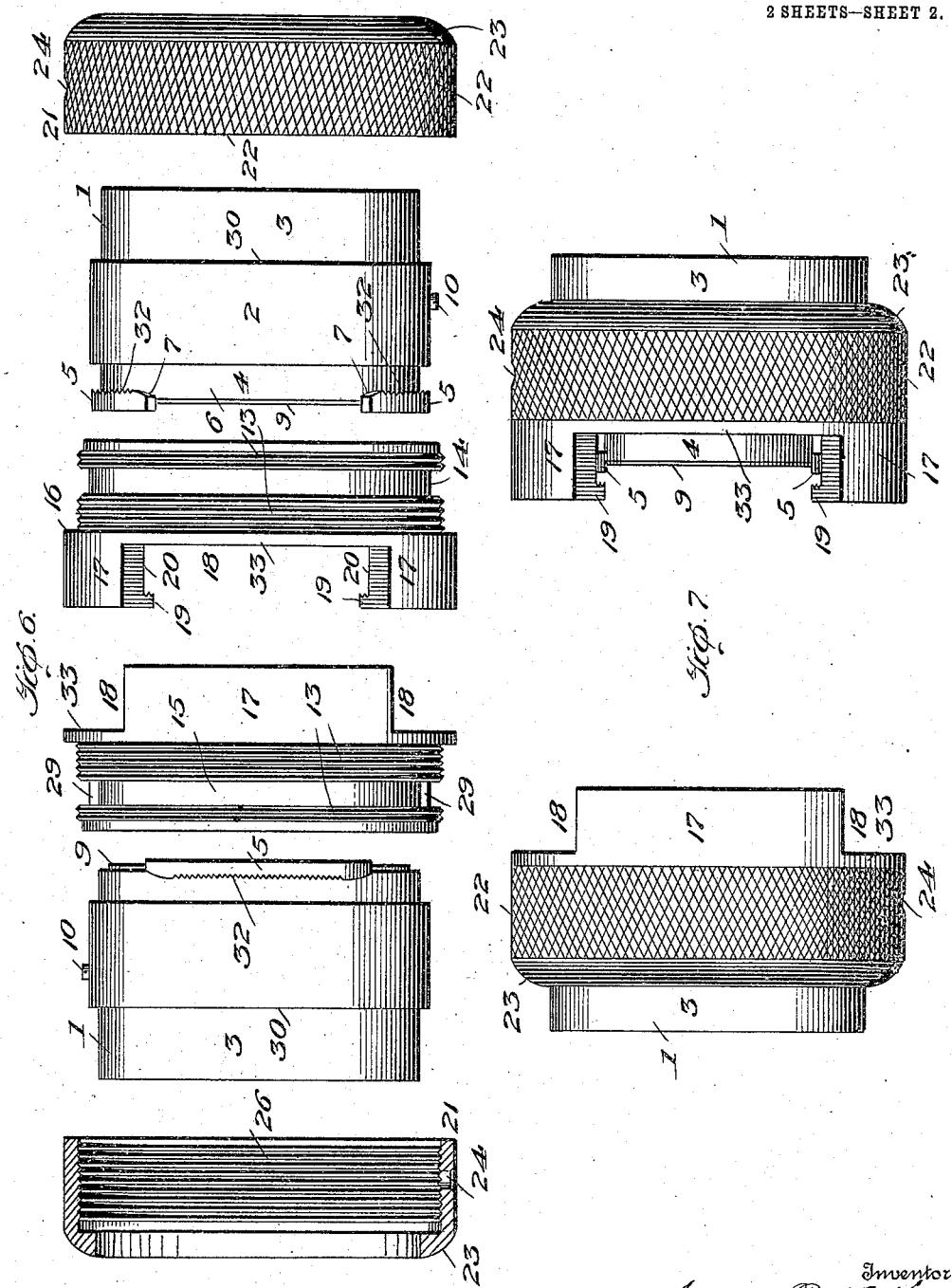

UNITED STATES PATENT OFFICE.

VINCEN P. McVOY, OF MOBILE, ALABAMA.

HOSE-COUPLING.

939,437. Specification of Letters Patent. Patented Nov. 9, 1909.

Application filed February 6, 1909. Serial No. 476,377.

*To all whom it may concern:*

Be it known that I, VINCEN P. McVOY, a citizen of the United States of America, and resident of Mobile, in the county of Mobile and State of Alabama, have invented certain new and useful Improvements in Hose-Couplings, of which the following is a specification.

The present invention relates to hose couplings and more particularly to that class known as quick-acting and in which two opposed sections have interlocking or engaging parts, a partial revolution of which only is necessary in order to accomplish the coupling, or, by a reverse motion, to uncouple.

The present invention has for its objects among others to provide a simple and improved, yet durable and efficient coupling composed of few parts and those readily assembled and actuated.

It has for a further object to provide simple and efficient means for preventing accidental retrograde movement of the parts when once coupled.

Other objects and advantages of the invention will hereinafter appear and the novel features thereof will be particularly pointed out in the appended claims.

The invention is clearly illustrated in the accompanying drawings, which, with the numerals of reference marked thereon, form a part of this specification, and in which—

Figure 1:
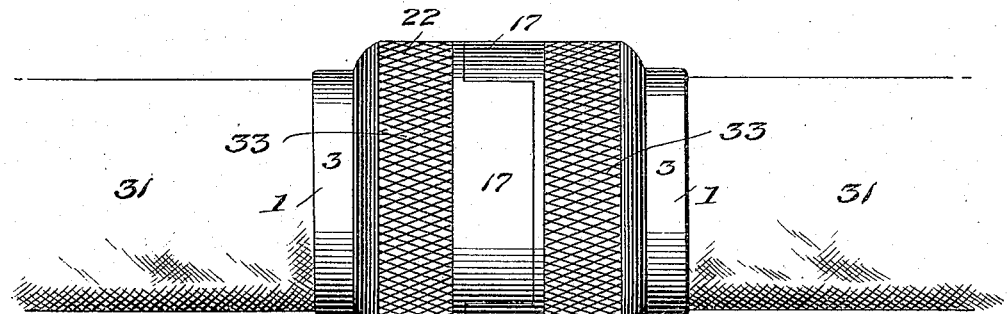
Figure 2:
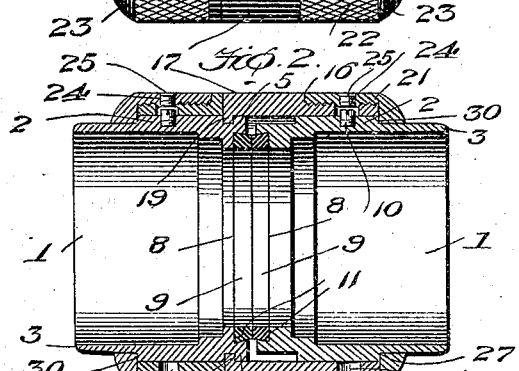
Figures 3, 4:
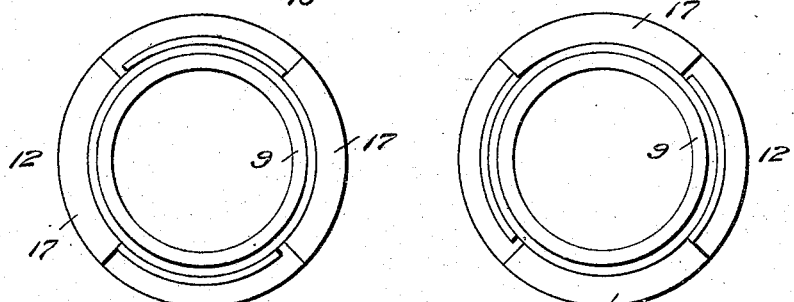
Figure 5:
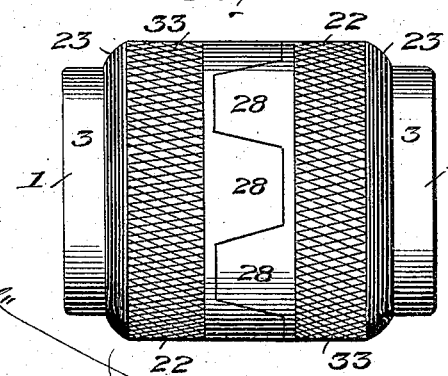

Figure 1 is a side elevation showing two sections of hose connected by my improved coupling. Fig. 2 is a substantially central longitudinal section through the coupling members in coupled position. Fig. 3 is a view looking at the inner end of one of the coupling sections. Fig. 4 is a similar view showing a different disposition of the parts. Fig. 5 is a side elevation of a slightly modified form of construction. Fig. 6 is an elevation on an enlarged scale showing the members of the two coupling sections separated but in their relative positions. Fig. 7 is an elevation, also on an enlarged scale, showing the two coupling sections ready for coupling.

Like numerals of reference indicate like parts in the several views.

As the coupling sections are alike in all respects, a detailed description of one will suffice for both.

Referring to the drawings, 1 designates the body portion or interior member of the one section. It is formed with the annular band portion 2 and the reduced annular portion 3. At the end opposite the reduced portion 3 is an annular groove 4, the outer wall of which is formed by the inner walls of the lugs 5, in this instance two in number and diametrically oppositely disposed, each lug extending substantially a quarter of the circumference of the member, leaving the spaces 6 between adjacent ends thereof, as seen clearly at the right of Fig. 6. These spaces merge into the groove 4, as will be clearly understood upon reference to said Fig. 6. The ends of the lugs 5 are rounded or tapered, as shown at 7, to facilitate engagement of the parts when the sections are coupled together. It is to be noted that the lugs 5 have their outer faces substantially flush with the outer periphery of the band 2, which not only increases the strength but permits of the application of the member which embraces the body portion from the lug end. This permits of the entire separation of the parts of the coupling member for repairs or other purposes without disconnection of the hose from the body portion. The end of the member 1 adjacent the lugs 5 is formed with a groove or gasket-receiving socket 8 in which is retained a gasket 9 of any suitable character, the said groove or socket being preferably undercut, as seen in Fig. 2, whereby the gasket may be retained by frictional engagement of the parts, although this frictional retention may be supplemented by cement or other suitable means, if desired.

The annular band 2 of the member 1 is provided with a threaded opening for the reception of a screw or pin 10, the function of which will soon be described.

The member 1 is formed at its inner end with an internal annual shoulder 11 which forms the backing for the gasket, as will be readily understood upon reference to Fig. 2.

By reason of the lugs 5 having their peripheral face flush with the outer face of the band 2 of the member 1, I am enabled to reduce the diameter of the coupling the thickness of the lugs which reduces the weight without decreasing the strength of the coupling member.

12 is the member coöperating with the body portion 1 and adapted to embrace the same. It is formed with the circumferential screw threads 13 interrupted by the annular groove 14 which extends entirely around the same, which for substantially one-half of its diameter is cut away entirely through the body portion of the member to form a substantially semi-circular slot 15, the object of which will soon be made apparent. Adjacent the inner end of the threaded portion is an annular shoulder 16, from which extend the lugs 17, in this instance two in number, diametrically oppositely disposed, and each extending substantially a quarter of the circumference of the member. This, of course, leaves spaces 18 at diametrically opposite points between adjacent ends of the two lugs. These lugs 17 are formed at their outer ends with the inwardly extending flanges 19, seen at the right of Fig. 6, which, of course, leaves the larger diameter 20 beyond the same, which diameter is the same as that of the band 2 of the body portion 1.

21 is a tightening and locking ring. It is formed with a roughened or milled periphery, as seen at 22, for an obvious purpose, and at its outer end is rounded, as seen at 23, so as to avoid abrupt shoulders, thus facilitating the drawing of the hose over the ground, out of wagons, through buildings etc. The milled periphery is provided with a screw hole 24 for the reception of a screw 25, as will be hereinafter explained. This ring is internally threaded, as seen at 26, to engage the threads 13 of the member 12, and at its outer end with an inwardly extending annular shoulder 27, as seen clearly in Fig. 2.

The lugs 17 may be parallel sided, as seen in Fig. 1, or they may be tapered, as seen at 28 in Fig. 5, to facilitate interengagement of the parts. While in Figs. 1, 2, 3, 4, 6 and 7, I have shown the sections as provided each with two lugs, it is evident that this number may be varied; for example, as seen in Fig. 5, this number may be materially increased.

In assembling the parts, the members 1 and 12 may be engaged by inserting the member 1 in the member 12, with the lugs 5 coincident with the spaces 18 of the member 12. The parts are then moved upon each other in the direction of their length until the lugs 5 are in line with the grooves 20. Then, by partial rotation of the parts, the lugs 5 are brought coincident with the inwardly extending flanges 19 of the member 12. Opening for the screw 10 in the band 2 will then be coincident with the slot 15 between the screw threads of the member 12 and then the screw 10 is affixed in position. This allows the member 12 to have rotary motion with relation to the member 1 but the engagement of the screw or stop member 10 with the shoulders 29 formed at the ends of the slot serves to limit the rotary movement of members with relation to each other. This screw or stop member 10 also serves, by engagement with the opposite walls of the slot, to limit the movement of the members endwise with relation to each other in one direction, movement in the opposite direction being limited by the shoulder 30 at the junction of the band 2 and the reduced portion 3 of the member 1. As will be seen in Fig. 2, the slot 14 is of greater width than the diameter of the screw 10 so as to permit of this limited endwise movement of the parts. These two parts having been thus assembled, the tightening and locking ring 21 is applied over the end of the member 1, as seen in Fig. 2, its threads being engaged with the threads 13 of the member 12 and, when sufficiently screwed up, the screw 25 is applied, the inner end of which works in the groove 14 of the member 12, in line with and over or outside of the stop member 10, as will be clearly understood upon reference to Fig. 2, the ring thus having rotary movement upon the threaded portion of the member 12 but limited in both directions, in or out, by engagement of the screw with the opposite side wall of the groove, the movement, however, being sufficient for all necessary endwise movement of the locking ring. With the members of the two sections assembled as above described, the parts are ready for coupling, it being understood that one section is secured to an end of the opposing lengths of hose 31. The parts of each section are turned so that the lugs 5 are coincident with the projections 20 and behind the inturned flanges 19 thereof. The two sections are then brought together with the projections of one coincident with the spaces between the projections of the other. Then a partial turn of the sleeves or members 12, either to the right or the left, causes the interlocking of the lugs, which interlocking, it will be understood, is double and that, when in this position, the parts are interengaged so that endwise movement is prohibited. Then turning up of the tightening and locking ring serves to securely retain the parts in such position so that it is impossible to uncouple without first slackening up the tightening and locking ring, or both rings, should both have been tightened (although tightening of one is sufficient to secure the parts and insure a water-tight joint), and turning of the members 12 in the reverse direction to that in which they were turned to couple. The parts may be then separated by endwise movement. The parts cannot be turned too far in either direction, being limited by the engagement of the pin or screw 10 with the shoulders 29 of the slot 15. As the tightening and locking ring is turned up, the inner wall of its inturned flange 27 engages with the shoulder 30 of the member 12, as will be seen in Fig. 2.

It will be noted that the parts are protected from ingress of dust, dirt and other extraneous matter and that the outer periphery is conspicuous by the absence therefrom of any projecting studs, lugs or other projections, leaving the coupling without abrupt shoulders, thus adapting it for easy manipulation, in taking out of wagons, dragging over the ground or through houses and the like.

In order to better insure against retrograde movement of the parts when coupled, I may serrate the inner faces of the lugs 5 and the inner faces of the inturned flanges 19 of the projections 17, as seen clearly at 32 in Figs. 6 and 7, so that, as the parts are turned up, the interengagement of these teeth or serrations effectually serve to prevent retrograde movement of the parts.

The annular band member 33 between the projections of the sleeve members serves to receive any impact occasioned by dropping of the coupling on the ground and protects the locking rings from injury.

Modifications in detail may be resorted to without departing from the spirit of the invention or sacrificing any of its advantages.

What I claim as new is:—

1. In a hose coupling, a coupling section comprising a body portion having at one end separated lugs within the periphery thereof, a sleeve member loosely embracing the same and having interrupted threads and projections with inturned flanges, and a tightening and locking ring rotatably mounted on the sleeve member, means being provided engageable between said threads for preventing endwise separation of the parts.

2. In a hose coupling, a coupling section comprising a body portion having at one end separated lugs within the periphery thereof, a sleeve member loosely embracing the same and having interrupted threads and projections with inturned flanges, and a tightening and locking ring rotatably mounted on the sleeve member, means being provided engageable between said threads for preventing endwise separation of the parts, the contacting faces of said lugs and inturned flange being serrated.

3. In a hose coupling, a coupling section composed of a body portion having separated lugs, a sleeve member embracing the body portion and having projections with inturned flanges at their outer ends, said sleeve member having circumferential screw threads with an interrupting groove, a tightening and locking ring having threaded engagement with the threads of the sleeve member, and inwardly extending means carried by said ring disposed in said groove for limiting the axial movement of the ring.

4. In a hose coupling, a coupling section composed of a body portion having separated lugs, a sleeve member embracing the body portion and having projections with inturned flanges at their outer ends, said sleeve member having circumferential screw threads with an interrupting groove, a tightening and locking ring having threaded engagement with the threads of the sleeve member, inwardly extending means carried by said ring disposed in said groove for limiting the axial movement of the ring, a portion of said groove being cut through to form a slot, and outwardly extending means on the body portion working in said slot for limiting the rotation of the sleeve.

5. A hose coupling section comprising a body portion with an annular band, a reduced portion and annular shoulder upon one side of said band, an annular groove upon the opposite side of the band, spaced lugs within the periphery of the band, a sleeve member rotatably mounted upon the body portion and having projections with inturned lugs at their outer ends, said sleeve member having exterior threads with an interrupting groove, stop means carried by said band and engageable with the end walls of said groove and a tightening and locking ring having threaded engagement with the threaded portion of the sleeve member, and means carried by said ring and engaged in said groove for limiting the axial movement of the ring.

6. A hose coupling section comprising a body portion with an annular band, a reduced portion and annular shoulder upon one side of said band, an annular groove upon the opposite side of the band, spaced lugs within the periphery of the band, a sleeve member rotatably mounted upon the body portion and having projections with inturned lugs at their outer ends, said sleeve member having exterior threads with an interrupting groove, stop means carried by said band and engageable with the end walls of said groove and a tightening and locking ring having threaded engagement with the threaded portion of the sleeve member, and means carried by said ring and engaged in said groove for limiting the axial movement of the ring, said ring having at its outer end an inturned flange for engagement with said shoulder of the body portion.

7. A hose coupling section comprising a body portion with an annular band, a reduced portion and annular shoulder upon one side of said band, an annular groove upon the opposite side of the band, spaced lugs within the periphery of the band, a sleeve member rotatably mounted upon the body portion and having projections with inturned lugs at their outer ends, said sleeve member having exterior threads with an interrupting groove, stop means carried by said band and engageable with the end walls of said groove and a tightening and locking ring having threaded engagement with the threaded portion of the sleeve member, and means carried by said ring and engaged in said groove for limiting the axial movement of the ring, said ring having at its outer end an inturned flange for engagement with said shoulder of the body portion, the contacting faces of said lugs and the inturned flanges of the projections being serrated.

8. A hose coupling comprising two like sections, each section embodying a body portion with spaced lugs within the periphery of said member, a sleeve member loosely embracing the body portion and having exterior threads with an interrupting groove projections with inturned flanges at their outer ends, means coöperating with the body portion and sleeve member and engageable in said groove to limit the relative rotary motion of said parts, and a tightening and locking ring having an inturned flange to engage a shoulder on the body portion and having threaded engagement with the sleeve member, and means carried by said ring for preventing endwise displacement thereof.

Signed by me at Washington, D. C., this 4th day of February 1909.

VINCEN P. McVOY.

Witnesses:
ROBERT A. BOSWELL,
E. H. BOND.